United States Patent [19]

Kurakake et al.

[11] Patent Number: 5,053,972
[45] Date of Patent: Oct. 1, 1991

[54] SPINDLE CONTROL SYSTEM

[75] Inventors: Mitsuo Kurakake, Hino; Jiro Kinoshita, Minamitsuru, both of Japan

[73] Assignee: Fanuc Ltd.

[21] Appl. No.: 343,264

[22] PCT Filed: Aug. 31, 1988

[86] PCT No.: PCT/JP88/00874
§ 371 Date: Apr. 17, 1989
§ 102(e) Date: Apr. 17, 1989

[87] PCT Pub. No.: WO89/02103
PCT Pub. Date: Mar. 9, 1989

[30] Foreign Application Priority Data

Sep. 2, 1987 [JP] Japan .................................. 62-220012

[51] Int. Cl.⁵ .............................................. G06F 15/46
[52] U.S. Cl. .................................. 364/474.12; 364/133
[58] Field of Search ......................... 364/474.12, 474.01, 364/474.3, 474.22, 474.24, 200, 900, 131, 133, 134; 318/569, 677, 595; 408/8, 9

[56] References Cited

U.S. PATENT DOCUMENTS 4,584,638 4/1986 Akasofu ............................... 364/136
4,714,999 12/1987 Kiya et al. ........................ 364/474.11
4,882,670 11/1989 Isobe et al. ........................... 364/188

Primary Examiner—Jerry Smith
Assistant Examiner—Paul Gordon

[57] ABSTRACT

A spindle control system in a numerical control apparatus (CNC).

A numerical control apparatus (1) and a PMC (2) are connected by a bus A (8), the numerical control apparatus (1) and a spindle speed control unit are connected by a bus B (9), a command from the numerical control apparatus (1) is sent to the spindle speed control unit (3) by the bus B (9), and a command from the PMC (2) is sent to the spindle speed control unit, via the numerical control apparatus (1), by the bus B (9).

As the interface between the spindle speed control unit (3) and the numerical control apparatus (1) is bus-connected, a simplified arrangement can be realized without the need for special cables or the like.

3 Claims, 2 Drawing Sheets

SPINDLE CONTROL SYSTEM

BACKGROUND OF THE INVENTION

The present invention relates to a spindle control system in a numerical control apparatus (CNC). More particularly, the present invention is directed to a spindle control system in which the connection between a numerical control apparatus and a spindle speed control unit is simplified.

Digitized digital spindles are now widely used for spindle motor control units in numerical control apparatuses. FIG. 2 shows a numerical control apparatus system using such a digital spindle.

In FIG. 2, numeral 1 denotes a numerical control apparatus (CNC), which reads out a machining program and delivers movement commands for various axes, a rotation command for a spindle motor, and a machine control signal for a programmable machine controller (PMC), etc., and 2 denotes the PMC which controls an actuator of a machine in accordance with commands from the numerical control apparatus (CNC) 1, and further, controls the starting and stopping of the rotation and the like of the spindle motor. Numeral 3 denotes a spindle speed control unit which has a digital arrangement and controls the speed of the spindle motor in response to a command from the numerical control apparatus (NC) 1, and further, in response to commands from the PMC 2, performs an internal sequence processing such as the rotation and stopping of the spindle motor. Numeral 4 denotes a spindle amplifier which current-amplifies commands from the spindle speed control unit 3 and controls the rotation of the spindle motor 7.

In the arrangement shown in FIG. 2, however, although the spindle speed control unit 3 itself is digitized, the interface with the numerical control apparatus (CNC) 1 is an analog signal. Further, the interface with the PMC 2 is not a bus but a discrete signal from each unit of hardware. Thus the interface of the spindle control unit 3 provides only a small amount of information and requires many cables.

SUMMARY OF THE INVENTION

The object of the present invention is to solve the above problems and provide a spindle control system in which the connection between a numerical control apparatus and a spindle control unit is simplified.

Therefore, according to the present invention, there is provided a spindle control system in a numerical control apparatus (CNC), such that the numerical control apparatus (CNC) and a PMC (programmable machine controller) are connected by a first bus, the numerical control apparatus (CMC) and a spindle speed control unit are connected by a second bus, a command from the numerical control apparatus (CNC) is sent to the spindle speed control unit by the second bus, and a command from the PMC is sent to the spindle speed control unit, via the numerical control apparatus, by the second bus.

The interface of the spindle speed control unit is executed by only the bus connection with the numerical control apparatus, and therefore, a simple arrangement can be provided without the need for special cables or the like.

DESCRIPTION OF THE PREFERRED EMBODIMENT

One embodiment of the present invention will now be described with reference to the drawings.

Figure 1:
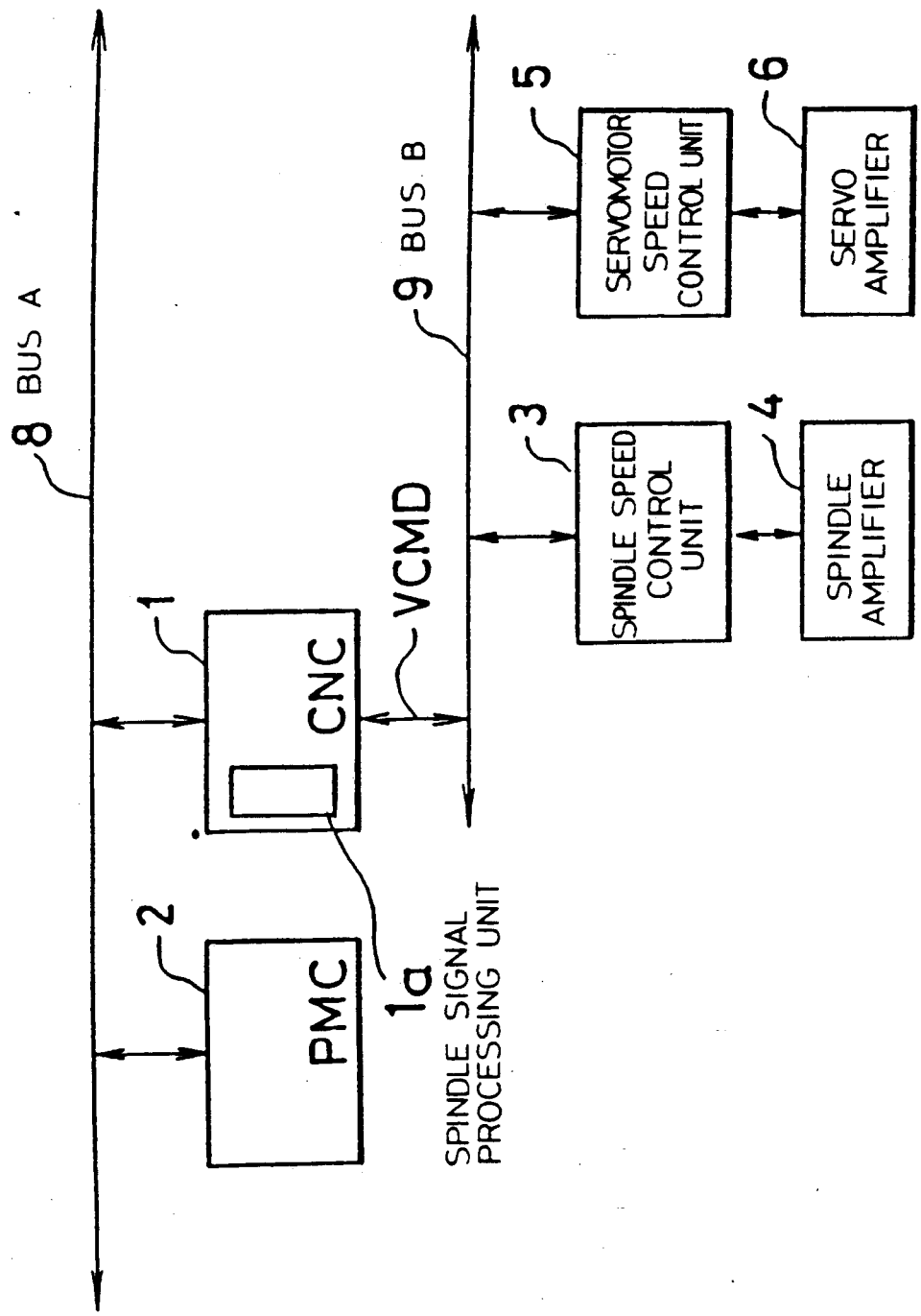
FIG. 1 is a block diagram of a numerical control apparatus system according to one embodiment of the present invention.
Figure 2:
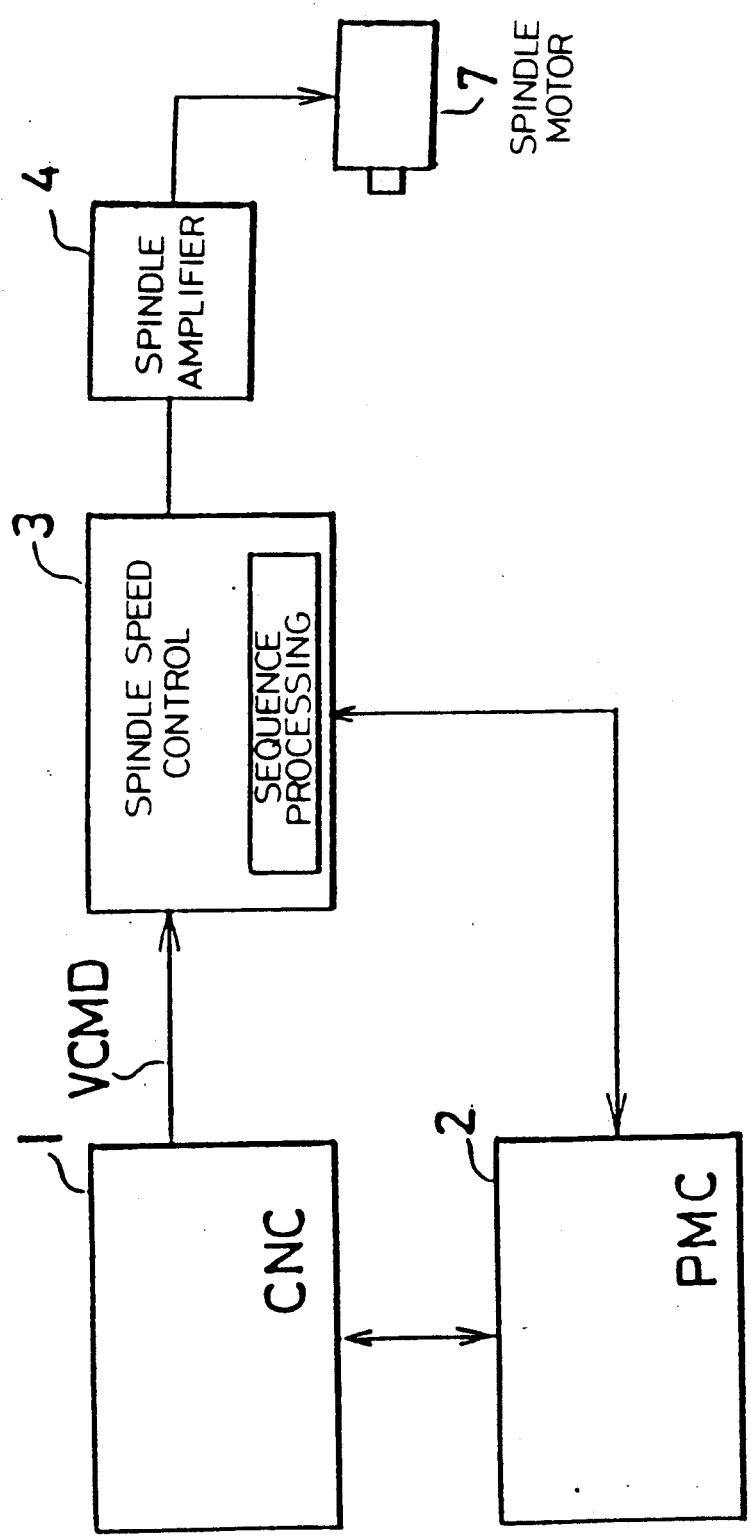
FIG. 2 is a block diagram of a prior art numerical control apparatus system using a digital spindle.

FIG. 1 is a block diagram of a numerical control apparatus system according to the embodiment of the present invention. In FIG. 1, numeral 1 denotes a numerical control apparatus (CNC), which reads out a machining program and delivers movement commands for various axes, a rotation command for a spindle motor, and a machine control signal for a PMC, etc. Numeral 2 denotes the PMC, which controls an actuator of a machine in accordance with commands from the numerical control apparatus (CNC) 1, and further, controls the starting and stopping of the rotation and the like of the spindle motor.

The numerical control apparatus 1 and the PMC 2 are connected by a bus A 8. An auxiliary function command, e.g., M03 (forward rotation of the spindle motor) or the like, from the numerical control apparatus is first input to and decoded by the PMC 2, and is then returned to a spindle signal processing unit of the numerical control apparatus 1. Accordingly, the interface is simplified because an interface between the PMC 2 and a spindle speed control unit 3 is eliminated, and only an interface between the numerical control apparatus 1 and the spindle control unit 3 is required.

Numeral 3 denotes the spindle speed control unit, which has a digital arrangement and controls the speed of the spindle motor in response to a command from the numerical control apparatus 1. The spindle speed control unit 3 is connected to the numerical control apparatus 1 by a bus B 9, and commands from the numerical control apparatus 1 are sent as digital signals through the bus B 9, which also carries commands from the PMC 2 sent through the spindle signal processing unit 1a in the numerical control apparatus 1.

Numeral 4 denotes a spindle amplifier which carries out a current-amplification of commands from the spindle speed control unit 3 and controls the rotation of the spindle motor (not shown). Numeral 5 denotes a servomotor speed control unit, which, like the spindle speed control unit, is digitized and performs current amplification in a servo amplifier 6 in response to commands sent from the numerical control apparatus 1 through the bus B 9, and to control a servomotor (not shown).

With the above arrangement, only the command from the bus B 9 is sent to the interface of the spindle control unit 3. This simplifies the interface itself, eliminates time loss, and enables the microprocessor of the spindle control unit 3 to control only the spindle motor at high speed.

According to the present invention, as described above, the construction of the spindle speed control unit is such that the interface thereof receives a command from only one bus connected to the numerical control apparatus, whereby the interface is simplified and the load of the microprocessor of the spindle speed control unit is reduced. Accordingly and accordingly the speed of the control or the spindle motor is greatly increased.

We claim:

1. A spindle control system in a numerical control apparatus (CNC), comprising:
   a first bus operatively connected to the numerical control apparatus;
   a second bus;
   a programmable machine controller (PMC), operatively connected to said first and second buses, for outputting a spindle control signal to said first bus;
   a spindle speed control unit, operatively connected to said second bus and the numerical control apparatus, a command from the numerical control apparatus being sent to said spindle speed control unit by said second bus, and a command from said PMC being sent to said spindle speed control unit, via the numerical control apparatus, by said second bus; and
   a spindle signal processing unit, operatively connected to said PMC, for receiving the spindle control signal from said PMC and sending said spindle control signal to said second bus.

2. A spindle control system according to claim 1, wherein said spindle speed control unit receives speed control commands in the form of digital signals from the numerical control apparatus and said PMC.

3. A spindle control system, comprising:
   a programmable machine controller outputting commands;
   a first bus connected to said programmable machine controller;
   a numerical control apparatus, coupled to said programmable machine controller and said first bus, for reading out machining programs, a rotation command, and a machine control signal for said programmable machine controller, said numerical control apparatus including a spindle signal processing unit;
   a second bus connecting said numerical control apparatus;
   a spindle speed control unit, connected to said second bus, for receiving the rotation command from said numerical control apparatus, and for receiving commands from said programmable machine controller by way of said numerical control apparatus and said second bus;
   a spindle amplifier connected to said spindle speed control unit;
   a servomotor speed control unit connected to said second bus;
   a servomotor amplifier connected to said servomotor speed control unit; and
   a spindle speed signal processing unit for receiving commands from said PMC and for outputting commands to said second bus.

* * * * *

UNITED STATES PATENT AND TRADEMARK OFFICE
CERTIFICATE OF CORRECTION

PATENT NO. : 5,053,972
DATED : OCTOBER 1, 1991
INVENTOR(S) : MITSUO KURAKAKE ET AL.

It is certified that error appears in the above-identified patent and that said Letters Patent is hereby corrected as shown below:

TITLE PAGE [73] Assignee: "Fanuc Ltd." should be
--Fanuc Ltd., Minamitsuru, Japan--;

TITLE PAGE, Col. 2, after line 7, insert the following:
--Attorney, Agent or Firm -- STAAS & HALSEY--.

Col. 1,   line 56, "(CMC)" should be --(CNC)--.

Col. 2,   line 67, "and accordingly" should be deleted;
line 68, "or" should be --of--.

Signed and Sealed this

Sixteenth Day of February, 1993

*Attest:*

STEPHEN G. KUNIN

*Attesting Officer*          *Acting Commissioner of Patents and Trademarks*